Patented Sept. 30, 1924.

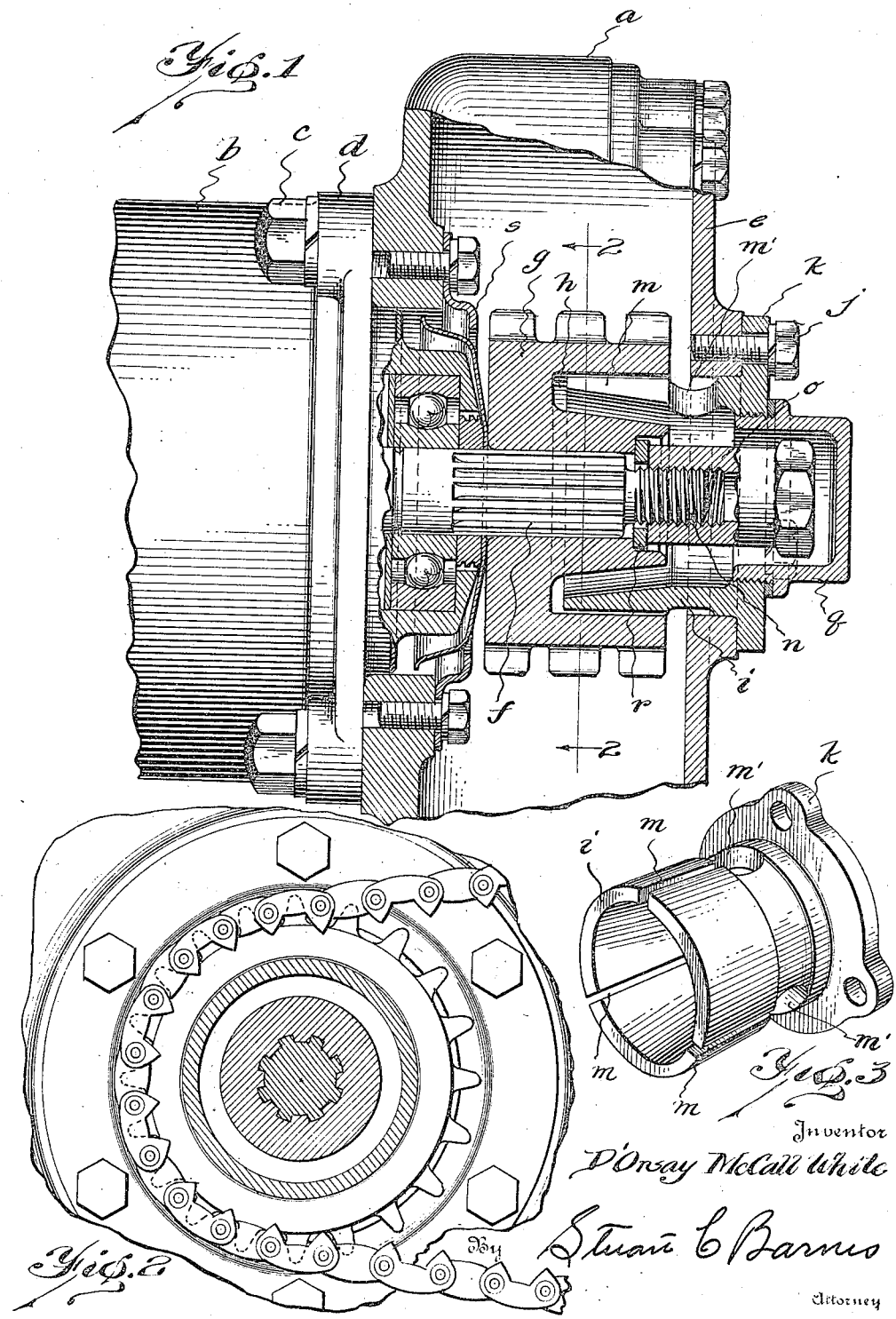

1,510,430

UNITED STATES PATENT OFFICE.

D'ORSAY McCALL WHITE, OF DETROIT, MICHIGAN.

SPROCKET MOUNTING.

Application filed December 10, 1923. Serial No. 679,618.

*To all whom it may concern:*

Be it known that I, D'ORSAY McCALL WHITE, a subject of Great Britain, residing at Detroit, in the county of Wayne and State of Michigan, have invented certain new and useful Improvements in Sprocket Mountings, of which the following is a specification.

This invention relates to a generator sprocket mounting and generator assembly for automobiles. In a great many of the best cars the generator is driven by a chain drive. If it is necessary at any time to remove the generator for repairs or inspection it is ordinarily necessary to tear down the front of the car to permit the generator to be disconnected from its sprocket. The radiator has to be removed, the cover taken off from the chain housing, and the sprocket wheel removed from the generator shaft. This is obviously a difficult and expensive job.

It is the object of the present invention to provide a sprocket mounting and assembly so designed as to provide a temporary support for the chain sprocket when the generator and shaft are removed. Furthermore, the fastening device that holds the sprocket wheel on the end of the generator shaft is accessible through the chain housing cover and does not require the removal of the cover in order to reach this part. These features will be more fully explained hereinafter.

In the drawings:

Fig. 1 is a side elevation partly in vertical section showing the generator coupled up to the chain sprocket in the chain housing.

Fig. 2 is a section taken on the line 2—2 of Fig. 1.

Fig. 3 is a perspective of the sprocket-supporting bracket.

$a$ designates the chain housing ordinarily located at the front of the engine; $b$ represents the generator which is bolted to the side of the chain housing by means of the bolts $c$ which pass through the flange $d$ of the generator. This would permit the generator to be readily removed from the chain housing were it not for the fact that the generator shaft is coupled up with the sprocket wheel that carries the chain. Ordinarily, the only way to disengage the generator which is directly coupled up with the sprocket wheel is to remove the radiator, take off the cover plate $e$ of the chain housing and then remove the chain and the sprocket wheel. This is obviously a job that requires considerable time and expense.

In order to avoid this I provide an improved form of assembly. The end of the generator shaft which is designated $f$ is splined as is also the sprocket $g$. However, the sprocket is provided with an annular recess $h$. In this annular recess projects a sprocket-supporting bracket $i$ which is bolted to the outside of the chain housing cover by the cap screws $j$, which pass through the flange $k$ of the bracket. When the sprocket is supported on the end of the splined generator shaft, there is a slight clearance between the sprocket-supporting bracket and the sprocket so that the one gives no support to the other under running conditions, and there is no wear. The sprocket-supporting bracket is slotted at $m$ and bored at $m'$ for the purpose of allowing dirt to drop through so as to avoid wear.

The extreme end of the generator shaft is screw-threaded as at $n$ and projects outwardly beyond the sprocket. This is arranged to take a special long nut $o$ which has a wrench hold that lies beyond the end of the sprocket-supporting bracket and also beyond the face of the cover plate. This permits this nut to be readily reached with a wrench when the plug $q$ is unscrewed.

If it is desired to remove the generator, all that is necessary is to unscrew the plug $q$ which may be done with a wrench inserted between the chain housing and the radiator. After the plug is taken out, then the generator shaft nut $o$ may likewise be reached with a wrench and this taken off. Care should then be exercised in seeing that the lock washer $r$ is taken off and removed through the opening; thereupon the bolts $c$ can be removed and the generator shaft simply drawn from the sprocket. A stop plate $s$ will prevent the sprocket from being drawn more than about one-eighth of an inch away from its normal position. As soon as the generator shaft is withdrawn from the sprocket hub the same drops down onto the sprocket-supporting bracket $i$. However, the clearance is so slight that the sprocket is held almost in its normal aligned position with respect to the axis on which the generator shaft turns.

To replace the generator shaft it is only necessary to push the generator shaft into the sprocket as the sprocket is held close enough to its normal position by the bracket to permit the generator to be readily coupled up therewith. The bolts c are then turned down to hold the generator to the housing. The lock washer r is then replaced on the end of the generator shaft, the shaft nut o is then turned down and the plug q is replaced.

It will be evident from the foregoing that the assembly and disassembly is very easily and readily made without disturbing any companion part of the car, as is customary in assemblies of this kind. It also appears that the assembly might possibly be used with other units that are driven or drive a chain. For this reason the generator unit is referred to in some of the claims as an "operative unit."

What I claim is:

1. In an automobile power plant, the combination of a housing, a rotating member, an operative unit provided with a shaft adapted to slidably engage in the hub of the rotating member in driving relation, a flexible driving element passing over the rotating member, and means in said housing for supporting such rotating member in its proper position when the shaft is withdrawn from the rotating member.

2. In an automobile power plant, the combination of a housing, a rotating member, an operative unit provided with a shaft adapted to slidably engage in the hub of the rotating member in driving relation, a flexible driving element passing over the rotating member, means in said housing for supporting such rotating member in its proper position when the shaft is withdrawn from the rotating member, and means accessible from the outside of the housing for releasing the shaft from the rotating member to permit it to be withdrawn.

3. In an automobile power plant, the combination of a housing, a rotatable member contained within the housing, an operative unit removably secured to the housing and provided with a shaft that projects into the rotatable member in slidable relation and supports the same, a flexible driving element running over the rotating member, and a supporting bracket supported in the housing and engaging the inside of the rotatable member to hold the same in its proper relation when the unit shaft is withdrawn.

4. In an automobile power plant, the combination of a housing, a rotatable member contained within the housing, an operative unit removably secured to the housing and provided with a shaft that projects into the rotatable member in slidable relation and supports the same, a flexible driving element running over the rotating member, and a slotted supporting bracket in the form of a sleeve that projects into a recess in the rotating member to support the same in proper position when the shaft is withdrawn from the rotating member.

5. In an automobile power plant, the combination of a housing, a recessed rotatable member contained within the housing, an operative unit removably secured to the housing and provided with a shaft that projects into the rotatable member in slidable relation and supports the same, a flexible driving element running over the rotating member, a flanged sleeve acting as a supporting bracket and having the sleeve portion projecting into a recess in the rotating member for supporting the same in proper position when the shaft is withdrawn, and means for removably securing the flange to the outside of the housing.

6. In an automobile power plant, the combination of a housing, a rotating member contained within the housing, an operative unit having a shaft slidably engaging in the rotating member and in driving relation therewith, the end of the shaft being provided with a threaded portion, a plug in the side of said housing, and a special nut screwing onto the end of the shaft and accessible through the opening left by the removal of the plug, said nut fastening the said shaft to the rotatable member and permitting the removal of the shaft from the rotatable member when the nut is disengaged.

7. In an automobile power plant, the combination of a housing, a rotatable member contained within the housing, an operative unit removably supported in relation to the housing and provided with a shaft slidably engageable with the rotatable member and having a driving relation therewith, the end of the shaft being screw-threaded, a plug in the housing in line with the shaft and removable from the housing, and a relatively long nut having a wrench hold beyond the housing and exposed when the plug is removed so that the shaft may be disengaged from the rotatable member by the removal of the nut.

8. In an automobile power plant, the combination of a housing, a rotatable member contained therein, an operative unit supported in removable relation with respect to the housing, and having a shaft adapted to be slidably removed from the rotatable member and provided with a screw-threaded end, and a relatively long nut engaging the screw-threaded ends of the shaft and having a wrench hold lying beyond the housing, substantially as described.

9. In an automobile power plant, the combination of a housing, an operative unit supported in removable relation with respect to the housing and provided with a shaft, a rotatable member supported in slidable relation on the end of said shaft and within the housing, said rotatable member provided with a recess, a supporting member provided with a sleeve portion adapted to rest in said recess but having a clearance with respect to the rotatable member when the same is supported on the end of the shaft, a plug removably secured in the supporting bracket, and a fastening device accessible from the outside of the housing and the bracket when the plug is removed and which fastens the end of the shaft to the said rotatable member.

10. In an automobile power plant, the combination of a chain housing, a chain sprocket contained within the housing, a generator removably bolted to the chain housing and provided with a shaft slidably engaging in the sprocket and removable therefrom, and a supporting bracket arranged to engage the sprocket and hold the same in proper relation when the generator shaft is slid out of the sprocket.

11. In an automobile power plant, the combination of a chain housing, a sprocket contained within the housing, a generator removably boltable to the housing and provided with a shaft in slidable relation with said sprocket, a supporting bracket ordinarily in spaced relation with respect to the sprocket but arranged to hold the sprocket in proper relation when the generator shaft is withdrawn therefrom, and means accessible from the outside of the housing for releasing the shaft from the sprocket.

In testimony whereof I affix my signature.

D'ORSAY McCALL WHITE.